US008356047B2

(12) United States Patent
Narayanan et al.

(10) Patent No.: US 8,356,047 B2
(45) Date of Patent: Jan. 15, 2013

(54) INTELLIGENT EVENT-BASED DATA MINING OF UNSTRUCTURED INFORMATION

(75) Inventors: Hariharan L. Narayanan, Tamil Nadu (IN); Arun Ramakrishnan, Tamil Nadu (IN); Krishna C. Shastry, Dakshina Kannada (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/571,782

(22) Filed: Oct. 1, 2009

(65) Prior Publication Data

US 2011/0082883 A1 Apr. 7, 2011

(51) Int. Cl.
*G06F 7/00* (2006.01)
*G06F 17/30* (2006.01)

(52) U.S. Cl. ........ 707/768; 707/765; 707/766; 707/773; 707/776; 706/18; 706/26; 704/4

(58) Field of Classification Search .................. None
See application file for complete search history.

(56) References Cited

U.S. PATENT DOCUMENTS

| | | | | |
|---|---|---|---|---|
| 6,658,483 B1 * | 12/2003 | Iwamoto et al. | ............... | 709/246 |
| 7,424,488 B2 * | 9/2008 | Aggarwal et al. | ...... | 707/999.005 |
| 7,668,823 B2 * | 2/2010 | Oldham et al. | ............... | 707/723 |
| 2005/0120009 A1 | 6/2005 | Aker | | |
| 2006/0224406 A1 * | 10/2006 | Leon et al. | ......................... | 705/1 |
| 2007/0088827 A1 | 4/2007 | Starbuck et al. | | |
| 2007/0100914 A1 | 5/2007 | Agrawal et al. | | |
| 2007/0112746 A1 | 5/2007 | Todhunter | | |
| 2008/0027979 A1 * | 1/2008 | Chandrasekar et al. | .. | 707/103 R |
| 2009/0157652 A1 * | 6/2009 | Barbosa et al. | ................... | 707/5 |

\* cited by examiner

*Primary Examiner* — Jau-Shya Meng
(74) *Attorney, Agent, or Firm* — Brevetto Law Group (57) ABSTRACT

A method, system and computer program product is disclosed for intelligent data mining. The method comprises receiving an event from an application, assigning property weights to properties of the event, and building a query from these properties based on the property weights. The method further comprises assigning search engine weights to a group of search engines, selecting at least some of the search engines based on the search engine weights, and sending the built query to the selected search engines. Results from the selected search engines are stored in a knowledge repository and used to adjust the property weights and the search engine weights. The invention may be used to provide an analysis with information about a problem, and to manage a solutions database which can be used for problem determination. The invention provides a low cost solution for collecting relevant information from online sources.

21 Claims, 6 Drawing Sheets

INTELLIGENT EVENT-BASED DATA MINING OF UNSTRUCTURED INFORMATION

BACKGROUND OF THE INVENTION

Problem determination involves diagnosing a problem using analysis of the events that occur in an environment and providing suitable solutions to a user or to provide automated solutions. For either of these tasks, i.e., providing solutions or automated recovery, a good understanding of the system and its working is a mandatory prerequisite. This is generally done by using Symptom Databases or other storage sources for problem causes and their solutions and whenever a problem occurs, an analysis is performed against this source to determine the solution.

However, considering a practical scenario a real-time environment would include a lot of different applications from a lot of different vendors working together. For example, a customer would have a business partner's web applications deployed on an IBM Websphere Application Server, while using Oracle as the database. This scenario has three different components (applications) from three different vendors: Websphere Application Server (IBM), Web Application (IBM Business Partner), and Database (Oracle).

Considering this scenario, it is understood that for a perfect problem determination analysis of such a system, a deep understanding is needed of all the three components. Practically, it would be impossible for any vendor to provide and maintain solutions and intelligence about some other vendor's (e.g., Oracle) applications, even though these might be used together with their products. This leads to an information "black box" where a support engineer does not have enough information or knowledge about some applications running in the environment.

From the above example, it would be easy to visualize the effort that would be required if IBM wants to provide solutions for problems with Oracle database, considering that the business partner would be providing information and symptom/solution details for their application. This would involve having a team of experts to create and maintain the solutions database for Oracle. If this is not done it would lead to a black box in the problem determination analysis performed for this environment, i.e., any problem occurring in the system would be diagnosable if and only if it is not related to the database, and any database related problems would have to be solved with the help of SME's/Specialized Administrators.

SUMMARY OF THE INVENTION

In one embodiment, the disclosure provides a method, system and computer program product for intelligent event-based data mining. The method comprises receiving an event from an application, said event having a set of properties, assigning each of said properties a respective property weight, building a query from said properties based on the property weights, and assigning each of a set of search engines a respective search engine weight. The method further comprises selecting at least some of the search engines based on the search engine weights, sending the query to the selected search engines, receiving query results from the selected search engines, storing the query results in a knowledge repository, and adjusting the property weights and the search engine weighs based on the query results.

Embodiments of the invention may be used to eliminate the above-mentioned black box in the problem determination analysis, and provides the analysis with some information about the problem and manages a solutions information database which can be used for problem determination. This is a low cost solution that collects relevant information at runtime from online sources which are the most current and valid information at any point of time.

The Internet is one of the largest and most comprehensive sources of information. This invention leverages the information available on the interne to provide problem determination solutions to a user. By collecting information from unstructured sources, such as blogs, forums etc., the invention can create and maintain a knowledge repository that aides users in quick problem determination and resolution.

In the ideal problem determination/resolution scenario, each support engineer knows from experience how to resolve problems in various applications. However, quite often a solution is not readily available; it may involve consulting experts or escalating issues or even a manual search in known locations such as an issue tracker website or forum.

The strategy employed in the present invention is to perform an analysis on unstructured information to find a solution with little or no intervention from a user. When a problem in the form of an event arises, a search is performed using various fields (message id, message text, component name etc.) of the event. The search can be on any source of information, for example generic Internet search, blogs, wiki pages or forums. The search results are processed for relevance, formatted and displayed to the user. Using the relevance values and the queries that were used, the system can learn which queries and which search sources return the best and most relevant sources of information. In subsequent runs, the system knows which properties and search sources provide the best information for different products.

Another way to address the above-discussed problem is to employ subject matter experts or specialized administrators to handle vendor applications. One of the problems with this approach is the costs involved in employing specialists. By the nature of being a specialist, he/she would be able to provide support for a certain component in the environment, (in this example the Oracle database). The specialist would then be idle until a relevant problem arises i.e. only problems that he/she is specialized to handle. A critical problem in this situation is the knowledge that is lost when a specialist leaves the organization. All the solutions and knowledge that the specialist has and uses from experience is lost. In contrast, using the autonomic solution of the present invention, every time a new problem solution is found, the solution is stored in a knowledge repository. This means that knowledge is retained within the organization, allowing new support engineers to be able to provide solutions and potentially eliminating the need to employ specialists. The support engineer is now empowered to handle a wider range of problems.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
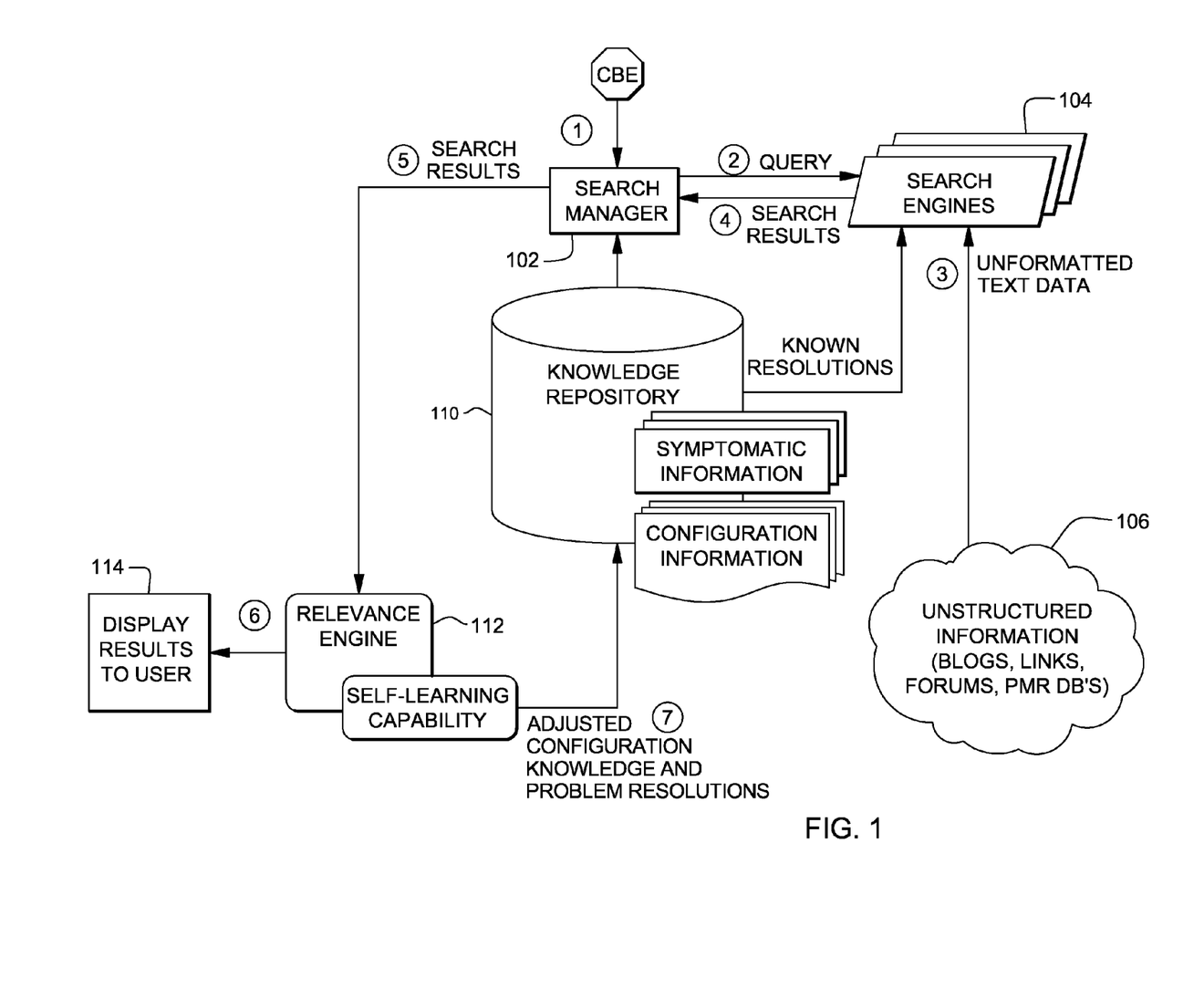
FIG. 1 shows an exemplary architecture for an intelligent event-based data mining system according to the present invention.
Figure 2:
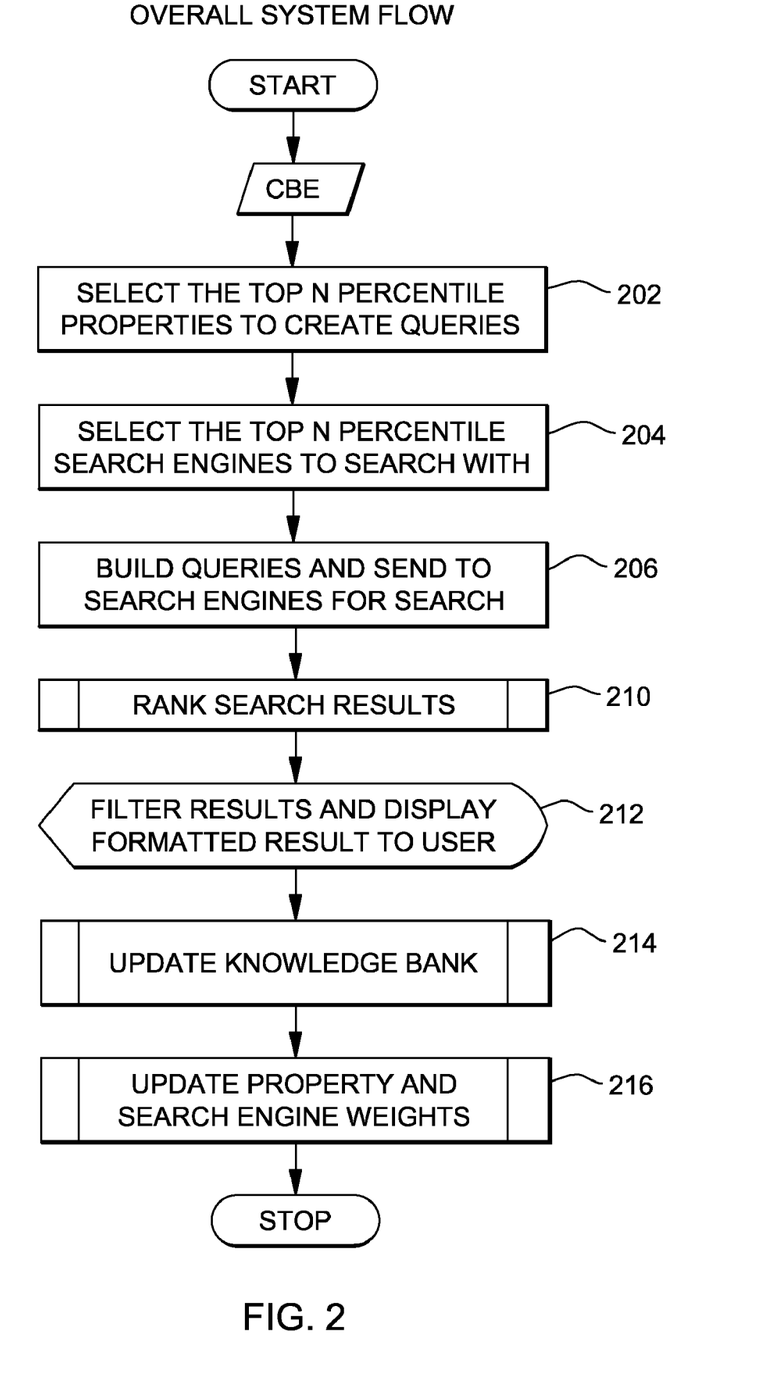
FIG. 2 illustrates the overall operation of the system of FIG. 1.

With reference to FIGS. 1 and 2, the Search Manager 102 receives CBE events, at step 202, from the application and starts processing on them. Using the various properties of the CBE, queries are built for the search. These queries are built according to the importance or weight assigned to the properties for a particular product. For example, searching with the message id for a DB2 problem might produce better results than searching with message text, while the reverse might be true for Oracle. To accommodate this property weights need to be stored per product. Initially, before the first run, default weights are assigned to the properties. The user or support engineer who has some experience in problem determination assigns these weights. That is, enough experience to assign high weights to valuable properties (e.g., message id) and low, or zero, weights to unimportant properties (e.g., creation time).

Sample product-property weights:
DB2_messageId=90
DB2_messageText=50
DB2_severity=10
DB2_creationTime=0

These weights provide a ranking of importance, implying that properties with higher values return better results when searched with. In this example, searching with the message Id gives the best results, and creation time (of the CBE event) should never be used while searching for a solution to the problem.

Firstly, a set P is created to represent the properties that will be used to build queries for search engines. Selecting which properties are taken into consideration while creating queries for search are done by ranking according to weight and calculating percentile for the properties. Properties at a given percentile (e.g., the 50th percentile) and above are, at step 202, taken to be used in queries. In the above DB2 example, using the 50th percentile will give the "message Id" and the "message text" properties. The most relevant properties are selected this way and queries are built. Each query contains the property value and the component name (e.g., "DB2 UDB" for DB2 Universal Database). The search queries, at step 206, are sent to search engines 104 selected in a similar manner.

Available search engines 104 are given rankings per product which effectively says when searching for information about a particular product, which search engines (in order) return the best results. Initially, all search engines are assigned a "product to search engine" weight of 100 and therefore, all search engines will be used to perform a search. Over subsequent runs, this value will be updated to reflect the likeliness of that search engine to return relevant results for a particular product. Similar to the product property weights, the set of search engines to be used, S, are selected, at step 204, by taking those at a given percentile and above.

Sample product—search engine weights:
DB2_ibmDB2InformationCenter=90
DB2_google=50
DB2_yahoo=10
DB2_ask.com=0

With the above example of search engine weights, if the percentile cutoff is 5, the queries will be sent to the first three search engines (IBM DB2 Information Center, Google and Yahoo). Once the queries are prepared, they can be sent to the search engines in decreasing order of product-search engine weight. The search can be on any source of information represented at 106, for example, generic Internet search, blogs, wiki pages or forums. The search results are processed for relevance by Relevance Engine 112, formatted and displayed to the user, as represented at 114. Also the results received from each of the search engines are ranked, at step 210, according to relevance with the event's properties in P and assigned a score.

Calculating a Search Result Relevance to a Query

Figure 3:
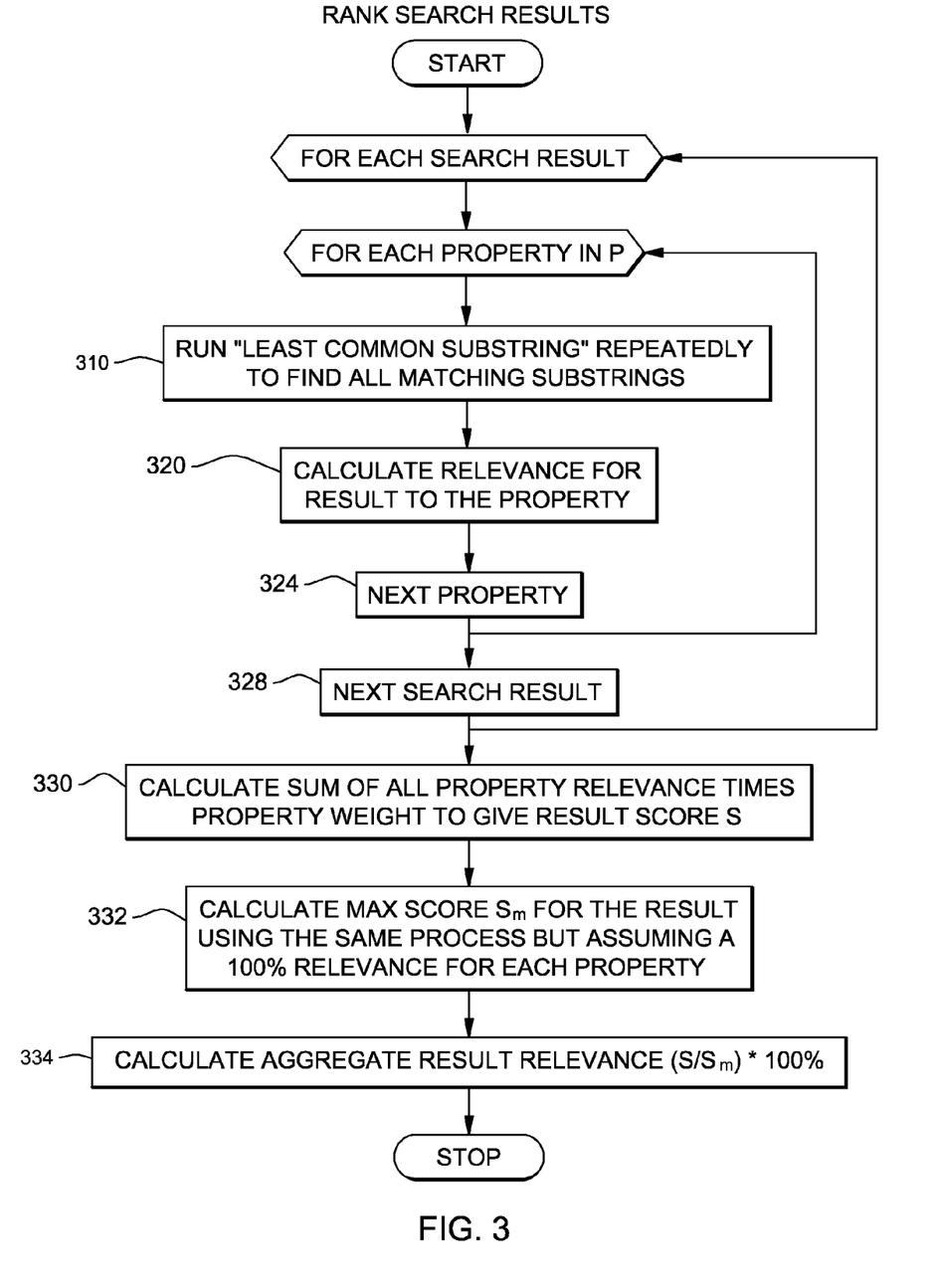
FIG. 3 shows an exemplary procedure for ranking the search result obtained in the system of FIG. 1

FIG. 3 illustrates a procedure for ranking the search results. In order to calculate the relevance of a search result with the query that was used to generate it, the text content of the search result is taken and, at step 310, the longest common substring between that and the query text is found. This process is run repeatedly, removing matched substrings from the query till no more matches are found.

For example, if the text content of the search result is:
Exception occurred while the JNDI NamingManager was processing a javax.naming.Reference object
Root exception is java.lang.reflect.InvocationTargetException
at sun.reflect.NativeMethodAccessorImpl.invoke0(Native Method)
at sun.reflect.NativeMethodAccessorImpl.invoke(NativeMethodAccessorImpl.java:85)
at sun.reflect.NativeMethodAccessorImpl.invoke(NativeMethodAccessorImpl.java:58)
at sun.reflect.DelegatingMethodAccessorImpl.invoke(DelegatingMethodAccessorImpl.java(Compiled Code))
at java.lang.reflect.Method.invoke(Method.java(Compiled Code))

And the query (created from the message text property) is as follows:
Exception occurred in the JNDI NamingManager while processing a javax.naming.Reference object Then repeatedly running the longest common substring should give:
processing a javax.naming.Reference object
the JNDI NamingManager
Exception occurred
while Using these substrings, a relevance of the result to the property can be calculated, at step 320. Firstly, common English words that are unrelated to the product or problem are eliminated from the matched strings and query. From the above example, the last match (while) is really quite irrelevant in the current context and should therefore be removed. These words (e.g., the, at, in, is, for) are removed from all the matched strings and queries.

For example, if we were to remove the words {"in", "the", "while", "a"} from the query and matched strings that leaves:
The query:
Exception occurred JNDI NamingManager processing javax.naming.Reference object
Matched strings:
processing javax.naming.Reference object
JNDI NamingManager
Exception occurred Now, using the trimmed query and matched strings, the relevance is calculated. Taking M={"processing javax.naming.Reference object", "Exception occurred", "JNDI NamingManager"} to be the set of matching substrings, with the following formula, the result relevance is calculated.

$$\frac{(m_1 \times m_2 \ldots m_n)}{N \times n} \times 100 = \text{Result Relevance},$$

where:
$m_n$ is the number of words in the nth match
N is the number of words in the query
n is number of matched subsequences From the above example the result relevance is 57.14%.

Similarly, as represented at steps 324 and 328, for each result, the relevance is calculated to all properties in P to gain the overall relevance of the search result to the CBE event that was received.

At step 330, these relevance values are multiplied by the weight of the corresponding property, giving a value between 0 and 10000, and are summed up to give an aggregate score S for the search result. (From the above query example using message text with a weight of 50, the message text property contributes 2857.14 [57.14*50] to S).

The maximum score $S_m$, is calculated, at step 332, by the same method except by assuming a 100% relevance for each of the properties. (In the same example, the message text property contributes 5000[100*50] to $S_m$).

The aggregate result relevance, calculated at step 334, which is used to rank the result is the percentage of S from $S_m$.

$$\frac{S}{S_m} \times 100 = \text{Aggregate Result Relevance}$$

The search results are then formatted and presented to the user, at step 212 of FIG. 2, along with the aggregate result relevance value.

Using the collected information and relevance values, the knowledge bank 110 and weights are updated, at steps 214 and 216, to reflect the learning from the search portion of the cycle. The result information is sent to the knowledge bank to store locally so in future runs, results can be found without an external search. The knowledge bank needs to be able to build a rule to match future events and provide results with relevance values.

Figure 4:
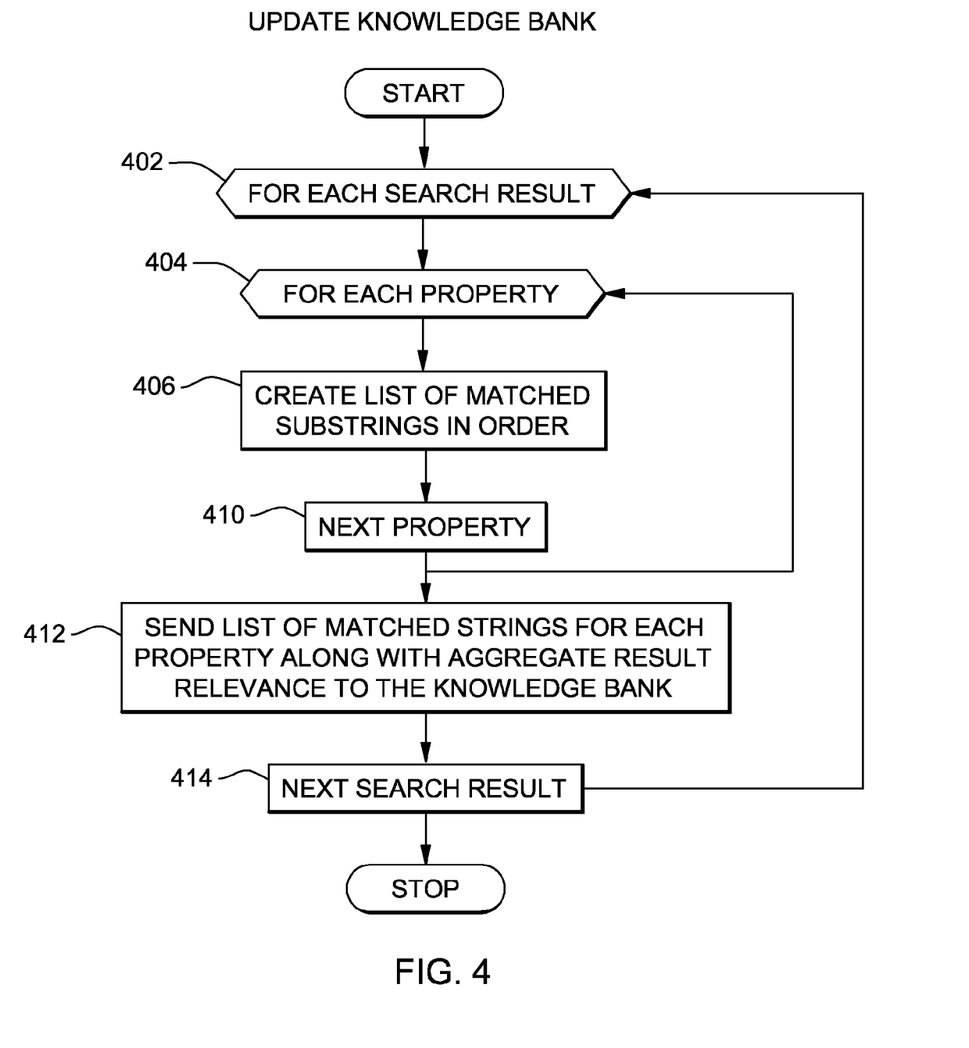
FIG. 4 depicts an exemplary procedure for updating the knowledge banks of the data mining system.

A procedure for updating the knowledge bank is shown in FIG. 4. As represented by steps 402, 404, 406, 410, 412 and 414, for each search result, the knowledge bank is sent the result URL, the result's relevance and a list of contributing properties with an ordered (by appearance) list of matched substrings for each property. In the example, the message text property is sent with the following list of substrings: {"Exception occurred", "while", "processing a javax.naming.Reference object", "the JNDI NamingManager"}. These substrings are complete as found in the query and not after removal of irrelevant words. If removed, then the knowledge bank will not be able to build rules to match future events with similar values for the property.

The knowledge bank can then store the result URL and relevance after building a rule to match the event using the supplied properties and values. This could be done, for example, using rule syntaxes such Regular Expressions or Xpath, depending upon how the knowledge bank will store this information.

Figure 5:
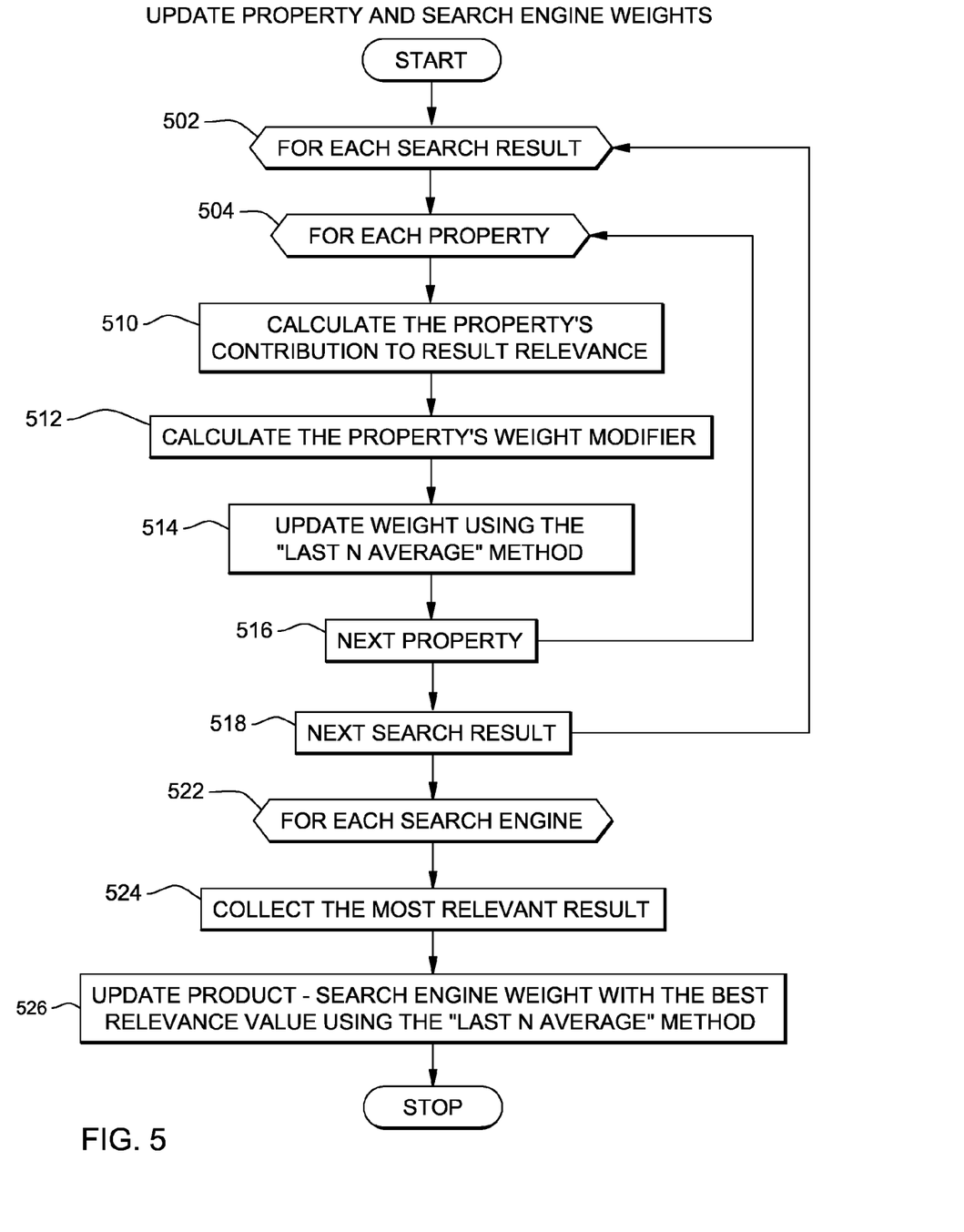
FIG. 5 shows an exemplary procedure for updating property and search engine weights that are used in the system of FIG. 1.

At step 216 of FIG. 2, the property and search engine weights are updated. FIG. 5 illustrates a procedure for doing this.

The product property weights are adjusted, at steps 502, 504, 510, 512, 514, 516 and 518, to indicate which properties give the best results per product. In order to adjust the weight, first, at step 510, the property's contribution to the result relevance is calculated.

$$\frac{R_v - W_v}{S} \times 100$$

where:
Rp is the relevance of the result to the property
Wp is the current weight of the property
S is the aggregate score of the search result The above formula is used, at step 512, to calculate the weight modifier for the property.

The new weight is calculated using an averaging formula, below. Instead of maintaining the number of cycles of execution to calculate the average, a "last N average" is taken at step 514.

N is a natural number which would decide the impact a new weight would have on the existing relevance and could range from 1 to any number. This ensures that the weights are sensitive to, and reflect the latest sources of information and most relevant queries that should be used. For example, if a particular property stops being useful while searching for a particular product, the weights should be able to quickly adapt to this change. A standard average method would make the weight increasingly insensitive to changes over time.

$$W'_p = \frac{(W_p \times (N-1) + W_m)}{N}$$

where:
W'p is the new weight of the property
Wp is the current weight of the property
Wm is the weight modifier of the property
N is the weight impact factor The product—search engine weights are updated, at steps 522, 524 and 526, using the weight of the most relevant result for that search engine including a 0 if no results are returned from a particular engine. The update to the current weight is done using the same "last N average".

$$W'_s = \frac{(W_s \times (N-1) + W_m)}{N}$$

where:
W'$_s$ is the new weight of the search engine
W$_s$ is the current weight of the search engine
W$_m$ is the relevance of the most relevant result
N is the weight impact factor Through this process of weighted search, the system is able to learn over time and subsequent cycles. By self updating weights, the system learns which properties/search engines need to be ignored and increases the importance of properties/search engines that consistently deliver comprehensive and relevant results. Over time, the search becomes increasingly focused and accurate. The system will be able to independently and automatically direct users to effective problem solutions, thus substantially reducing or minimizing manual processes.

This system can be inserted into the scenario of a software infrastructure that has, for example, Websphere Application Server from IBM, a Web Application from an IBM business partner and the Oracle Database from Oracle (a third party vendor).

Initially the Oracle Database poses the "Black Box" problem wherein a support engineer does not have the experience to handle third party products like Oracle. When the third party product is brought into the environment, the system of this invention needs to be configured to handle the new product. The product—property/search engine weights need to be set at initial estimated values. The system will begin searching for solutions for events that are received and over subsequent cycles will reach a mature state. At this mature state, the system knows which properties and which search engines provide the best search results for the Oracle Database.

By maintaining the information mined from unstructured data in a knowledge bank, the system makes itself independent from the experience of the user. This ensures that this knowledge is maintained within the organization, and problems are resolved efficiently and cost effectively.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
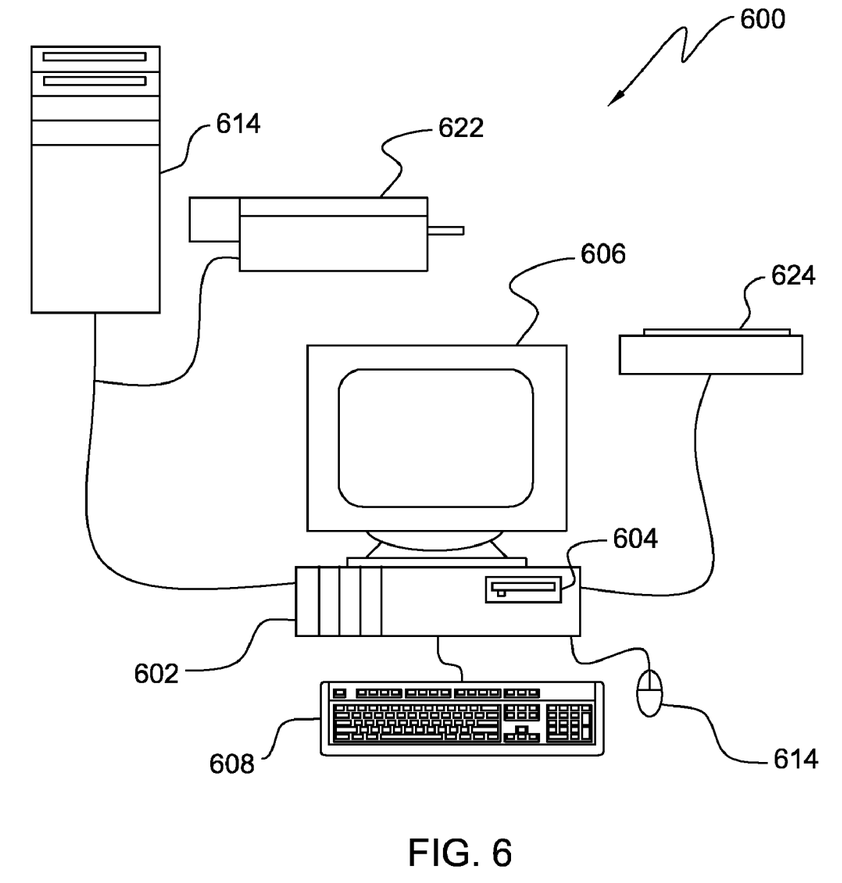
FIG. 6 illustrates an exemplary computing system that may be used to practice this invention.

A computer-based system 600 in which a method embodiment of the invention may be carried out is depicted in FIG. 6. The computer-based system 600 includes a processing unit 602, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 602 through a disc drive 604, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 602, as mentioned, or may be located on a remote system such as a server 614, coupled to processing unit 602, via a network interface such as an Ethernet interface. Monitor 606, mouse 614 and keyboard 608 are coupled to the processing unit 602, to provide user interaction. Scanner 624 and printer 622 are provided for document input and output. Printer 622 is shown coupled to the processing unit 602 via a network connection, but may be coupled directly to the processing unit. Scanner 602 is shown coupled to the processing unit 602 directly, but it should be understood that peripherals might be network coupled, or direct coupled without affecting the ability of the processing unit 602 to perform the method of the invention.

While it is apparent that the invention herein disclosed is well calculated to fulfill the objects stated above, it will be appreciated that numerous modifications and embodiments may be devised by those skilled n the art, and it is intended that the appended claims cover all such modifications and embodiments as fall within the true spirit and scope of the present invention.

What is claimed is:

1. A method of intelligent event-based data mining, comprising:
   receiving an event from an application, said event having a set of properties;
   assigning each of said properties a respective property weight;
   building a query from said properties based on the property weights;
   assigning each of a set of search engines a respective search engine weight;
   selecting at least some of the search engines based on the search engine weights;
   sending the query to the selected search engines;
   receiving query results from the selected search engines;
   storing the query results in a knowledge repository; and
   adjusting the property weights and the search engine weights based on the query results,
   wherein the adjusting of said property weights and the search engine weights includes calculating a search result relevance for each query result and using said search result relevance to adjust the property weights and the search engine weights;
   wherein the calculating of said search result relevance includes, for each of the query results, identifying the number of common text substrings that occur in both the query and said each query result, and using said number of common text substrings to calculate the search result relevance for said each query result; and
   wherein using said number of common text substrings to calculate the search result relevance for said each query result includes calculating the result relevant using the equation:

$$\frac{(m_1 \times m_2 \ldots m_n)}{(N \times n)} \times 100 = \text{Result Relevance}$$

where:
   $m_n$ is the number of words in the nth match
   $N$ is the number of words in the query
   $n$ is the number of matched subsequences.

2. The method according to claim 1, wherein building a query from said properties based on the property weights includes:
   selecting all of the properties having a property weight above a defined value; and
   building the query from the selected properties;
   wherein the event describes a problem in the application and includes a message identification, message text, and a component name associated with the event; and
   wherein the query results pertain to a solution for the problem.

3. The method according to claim 1, wherein selecting at least some of the search engines based on the search engine weights includes the step of selecting all of the search engines having a search engine weight above a defined value.

4. The method according to claim 1, wherein identifying the number of common text substrings that occur in both the query and said each query result includes:
   identifying the longest common substring in both the query and said each query result;
   removing said longest common substring from the query to obtain a modified query; and
   identifying the longest common substring in both the modified query and said query result.

5. The method according to claim 1, wherein identifying the number of common text substrings that occurs in both the query and said each query result includes:
   forming a set of said common text substrings; and
   removing from said set all occurrences of any of a given set of text substrings to form a trimmed set of common substrings.

6. The method according to claim 1, wherein adjusting the property weights and the search engine weights includes summing the search result relevances of all of the queries to obtain an aggregate relevance score.

7. The method according to claim 1, wherein adjusting the property weights and the search engine weights includes calculating a contribution of each of the selected properties to each of the query results.

8. A system for intelligent event-based data mining, comprising one or more processing units configured for:
   communication means configured to receive an event from an application, said event having a set of properties;
   a processor configured to assign each of said properties a respective property weight;
   a memory suitable for storing a search manager configured to build a query from said properties based on the property weights;
   said search manager further being configured for:
   assigning each of a set of search engines a respective search engine weight;

selecting at least some of the search engines based on the search engine weights;
sending the query to the selected search engines;
receiving query results from the selected search engines;
storing the query results in a knowledge repository; and
adjusting the property weights and the search engine weights based on the query results, wherein the adjusting of said property weights and the search engine weights includes calculating a search result relevance for each query result and using said search result relevance to adjust the property weights and the search engine weights;
wherein the calculating of said search result relevance includes, for each of the query results, identifying the number of common text substrings that occur in both the query and said each query result, and using said number of common text substrings to calculate the search result relevance for said each query result; and
wherein using said number of common text substrings to calculate the search result relevance for said each query result includes calculating the result relevant using the equation:

$$\frac{(m_1 \times m_2 \ldots m_n)}{(N \times n)} \times 100 = \text{Result Relevance}$$

where:
$m_n$ is the number of words in the nth match
N is the number of words in the query
n is the number of matched subsequences.

9. The system according to claim 8, wherein building a query from said properties based on the property weights includes:
selecting all of the properties having a property weight above a defined value; and
building the query from the selected properties;
wherein the event describes a problem in the application and includes a message identification, message text, and a component name associated with the event; and
wherein the query results pertain to a solution for the problem.

10. The system according to claim 8, wherein selecting at least some of the search engines based on the search engine weights includes the step of selecting all of the search engines having a search engine weight above a defined value.

11. The system according to claim 8, wherein identifying the number of common text substrings that occur in both the query and said each query result includes:
identifying the longest common substring in both the query and said each query result;
removing said longest common substring from the query to obtain a modified query; and
identifying the longest common substring in both the modified query and said query result.

12. The system according to claim 8, wherein adjusting the property weights and the search engine weights includes summing the search result relevances of all of the queries to obtain an aggregate relevance score.

13. The system according to claim 8, wherein adjusting the property weights and the search engine weights includes calculating a contribution of each of the selected properties to each of the query results.

14. A computer program product for intelligent event-based data mining, comprising a non-transitory computer readable medium having computer usable program code embodied thereon, the computer usable program code, upon being executed on a computer, causing steps comprising:
receiving an event from an application, said event having a set of properties;
assigning each of said properties a respective property weight;
building a query from said properties based on the property weights;
assigning each of a set of search engines a respective search engine weight;
selecting at least some of the search engines based on the search engine weights;
sending the query to the selected search engines;
receiving query results from the selected search engines;
storing the query results in a knowledge repository; and
adjusting the property weights and the search engine weights based on the query results,
wherein the adjusting of said property weights and the search engine weights includes calculating a search result relevance for each query result and using said search result relevance to adjust the property weights and the search engine weights;
wherein the calculating of said search result relevance includes, for each of the query results, identifying the number of common text substrings that occur in both the query and said each query result, and using said number of common text substrings to calculate the search result relevance for said each query result; and
wherein using said number of common text substrings to calculate the search result relevance for said each query result includes calculating the result relevant using the equation:

$$\frac{(m_1 \times m_2 \ldots m_n)}{(N \times n)} \times 100 = \text{Result Relevance}$$

where:
$m_n$ is the number of words in the nth match
N is the number of words in the query
n is the number of matched subsequences.

15. The computer program product according to claim 14, wherein:
building a query from said properties based on the property weights includes selecting all of the properties having a property weight above a defined value, and building the query from the selected properties;
wherein the event describes a problem in the application and includes a message identification, message text, and a component name associated with the event; and
wherein the query results pertain to a solution for the problem.

16. The computer program product according to claim 15, wherein adjusting the property weights and the search engine weights includes calculating a contribution of each of the selected properties to each of the query results.

17. The computer program product according to claim 14, wherein identifying the number of common text substrings that occurs in both the query and said each query result includes forming a set of said common text substrings, and removing from said set all occurrences of any of a given set of text substrings to form a trimmed set of common substrings.

18. The computer program product according to claim 14, wherein selecting at least some of the search engines based on the search engine weights includes the step of selecting all of the search engines having a search engine weight above a defined value.

19. The computer program product according to claim 14, wherein identifying the number of common text substrings that occur in both the query and said each query result includes:
  identifying the longest common substring in both the query and said each query result;
  removing said longest common substring from the query to obtain a modified query; and
  identifying the longest common substring in both the modified query and said query result.

20. The computer program product according to claim 14, wherein identifying the number of common text substrings that occurs in both the query and said each query result includes:
  forming a set of said common text substrings; and
  removing from said set all occurrences of any of a given set of text substrings to form a trimmed set of common substrings.

21. The computer program product according to claim 14, wherein adjusting the property weights and the search engine weights includes summing the search result relevances of all of the queries to obtain an aggregate relevance score.

* * * * *